United States Patent
Hull

(10) Patent No.: US 6,684,580 B1
(45) Date of Patent: Feb. 3, 2004

(54) POST STABILIZATION SUPPORT

(76) Inventor: David Hull, 262 Blueberry Dr., Columbiana, OH (US) 44408

( * ) Notice: Subject to any disclaimer, the term of this patent is extended or adjusted under 35 U.S.C. 154(b) by 0 days.

(21) Appl. No.: 10/265,382

(22) Filed: Oct. 7, 2002

(51) Int. Cl.$^7$ .......................... F16M 13/00; E02D 27/42
(52) U.S. Cl. .............................. 52/170; 52/149; 52/152; 52/127.2; 256/19; 256/64; 33/379
(58) Field of Search .................. 52/146, 149, 152, 52/170, 127.2, 126.1, 749.1; 256/19, 30, 31, 63, 64; 248/519, 163.1, 166, 412, 188.5, 180.1, 177.1; 33/379, 404

(56) References Cited

U.S. PATENT DOCUMENTS

| | | | | |
|---|---|---|---|---|
| 877,268 A | * | 1/1908 | Buren | 52/165 |
| 882,870 A | * | 3/1908 | Cary | 135/140 |
| 1,217,606 A | * | 2/1917 | Kane | 384/24 |
| 1,722,352 A | * | 7/1929 | Rawley | 52/152 |
| 2,903,856 A | * | 9/1959 | Dean | 405/225 |
| 3,051,425 A | * | 8/1962 | Homrighausen | 248/168 |
| 3,239,176 A | * | 3/1966 | Johnson | 248/166 |
| 3,809,346 A | | 5/1974 | Jackson | |
| 4,099,354 A | * | 7/1978 | DePirro | 52/146 |
| 4,202,108 A | * | 5/1980 | Adams et al. | 33/379 |
| 5,104,074 A | | 4/1992 | Malloy | |
| 5,192,055 A | | 3/1993 | Griggs et al. | |
| 5,207,004 A | * | 5/1993 | Gruetzmacher | 33/379 |
| 5,255,443 A | * | 10/1993 | Schmidt | 33/373 |
| 5,460,344 A | | 10/1995 | Malloy | |
| 5,685,522 A | | 11/1997 | Randolph, Jr. | |
| 6,155,529 A | * | 12/2000 | De Carlo | 248/523 |
| 6,254,043 B1 | * | 7/2001 | Schwarzler | 248/163.1 |

* cited by examiner

Primary Examiner—Brian E. Glessner
(74) Attorney, Agent, or Firm—Harpman & Harpman

(57) ABSTRACT

An adjustable post stabilization support device that includes a multiple sided post receiving sleeve having oppositely disposed pairs of extensible ground engagement leg assemblies thereon. Locking cam levers securing the sleeves on said posts with the extensible leg assemblies being hinged to the bottom of the sleeve. Each of the leg assemblies is independently adjustable and has a ground engagement foot on its extensible portion. Vertical orientation provided for alignment of the sleeve and associated post by two horizontal planes.

16 Claims, 5 Drawing Sheets

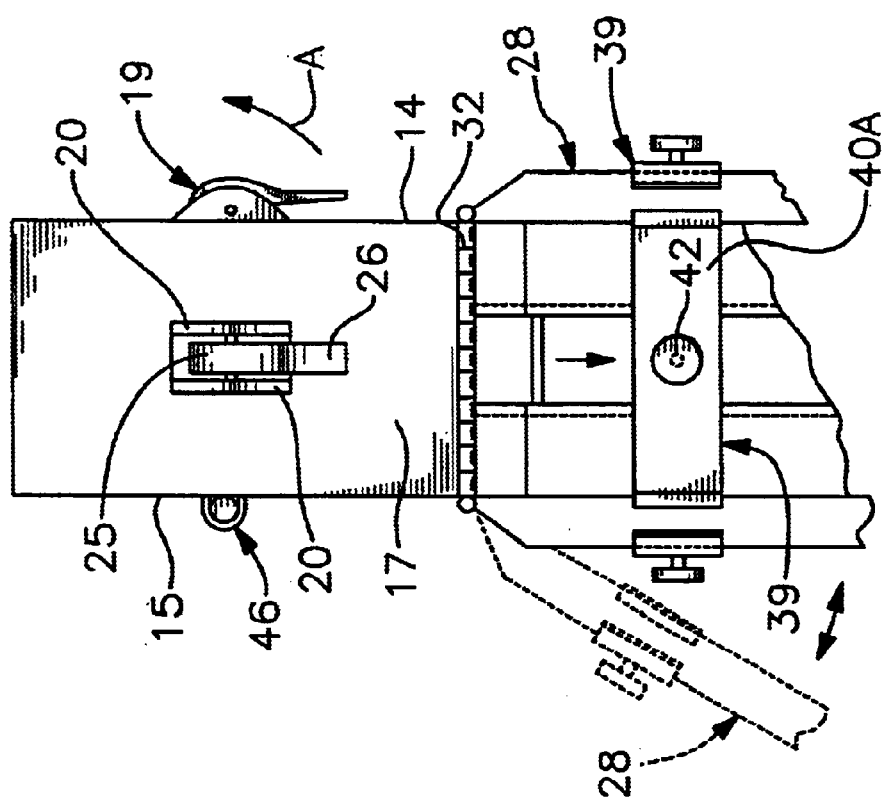
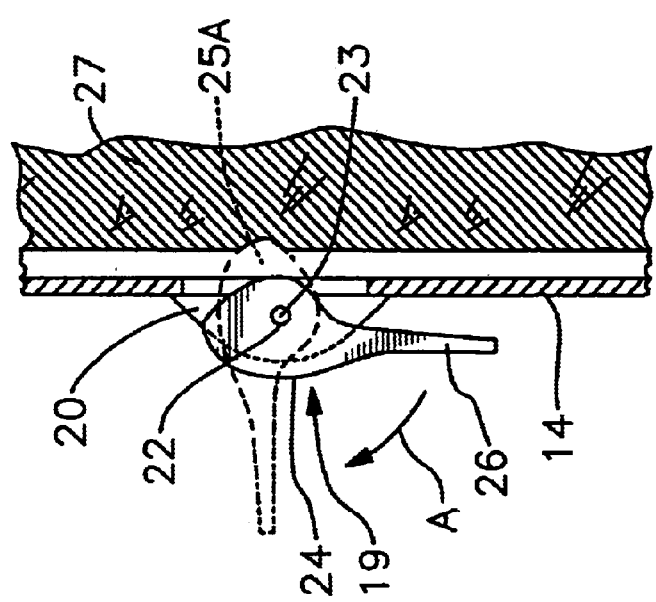

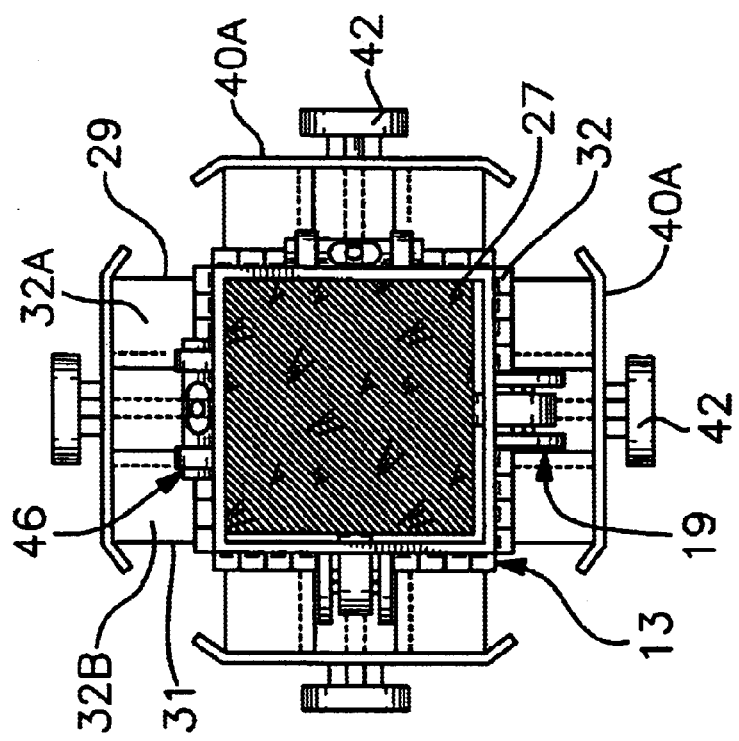
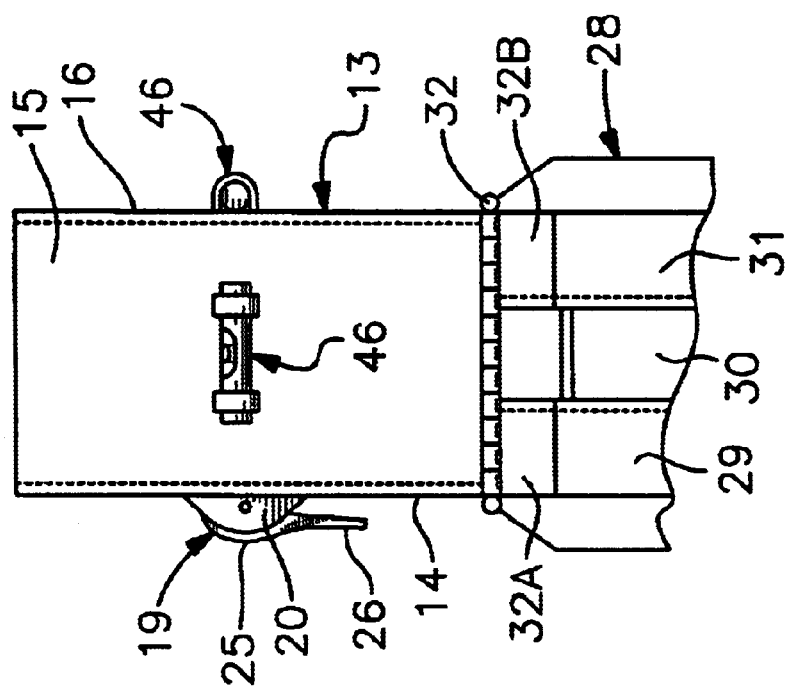
Fig. 6
Fig. 5

POST STABILIZATION SUPPORT

BACKGROUND OF THE INVENTION

1. Technical Field

This invention relates to post supporting devices that are used to temporarily hold a fence post or the like and vertical alignment in the ground during installation.

2. Description of Prior Art

Prior art devices have been directed to fence posts and the like that are inserted into the ground by digging a hole, placing the post within and filling around the post with concrete and allowing it to set. The installation of such a post is difficult and time consuming requiring a temporary support to be used to hold the post in an upright vertical position (plum) while the cement hardens. Typically, such temporary supports are made on site by the use of scrap lumber nailed to the post and to a stake driven into the ground on two vertical planes. Such temporary supports are required in two directions to assume proper vertical alignment.

Prior art is directed to permanent brace systems that can be reused and require less time to set up. More specifically, most prior art is directed to semi-permanent fence post supports used to brace and hold metal fence post that are driven directly into the ground. Such fence bracing is used on corner support posts or where high lateral loads would be encountered, such as gate supports and the like.

In U.S. Pat. No. 3,809,346, a fence post support is disclosed having a post engagement socket extending from a ground engagement base plate extending under the socket. Pairs of angularly apertured brackets receive drift pins that are driven into the ground at angles to hold the socket base in vertical position.

Prior art patents directed towards fence post supports for fence posts driven into the ground can also be seen in U.S. Pat. Nos. 5,104,074, 5,192,055, and 5,460,344.

In U.S. Pat. No. 5,104,074 a fence post support can be seen having a pair of tubular braces that are held on the fence post by a collar that slips over the post and bearing elements which are pivotally secured to the ends of the respective tubular braces.

In U.S. Pat. No. 5,192,055, a portable brace assembly for fence posts having a pair of interengaging posts brackets as disclosed. Multiple adjustable legs extend from the upper bracket while the lower post engagement bracket have ground engagement members which are adjusted to correspond to ground surface variations.

A fence support can be seen in U.S. Pat. No. 5,460,344 wherein a pair of legs are temporarily secured to a metal fence post by an engagement collar. Each leg has a ground engagement pin sleeve for guiding a pin within aligned configuration utilizing a secondary leg assembly so multiple legs can extend from a single post engagement fitting or interengage with a second post in spaced relation thereto.

Finally, in U.S. Pat. No. 5,685,522, a fence post trim collar is claimed having a collar with hinge sections to be placed around the base of the post to prevent the growth of vegetations thereabout.

SUMMARY OF THE INVENTION

The present invention is directed to a post alignment and support device that includes an adjustable post engagement sleeve removably secured to the post. Pairs of multiple leg assemblies extend from the sleeve to provide a four-point support for the post. Each leg assembly has an extensible ground engagement leg portion that can be extended or retracted to the required length to maintain the post in a true vertical upright alignment until a foundation material about the post is set. Leveling devices are integrated within the sleeve for ease of vertical alignment by corresponding horizontal planes.

DESCRIPTION OF THE DRAWINGS

FIG. 3 is an enlarged partial cross-sectional view illustrating the cam locking assembly of the invention;

FIG. 4 is a left side elevational view of the invention with portions broken away;

FIG. 5 is a right side elevational view of the invention with portions broken away;

FIG. 6 is a top plan view of the invention;

DESCRIPTION OF THE PREFERRED EMBODIMENT

Figure 2:
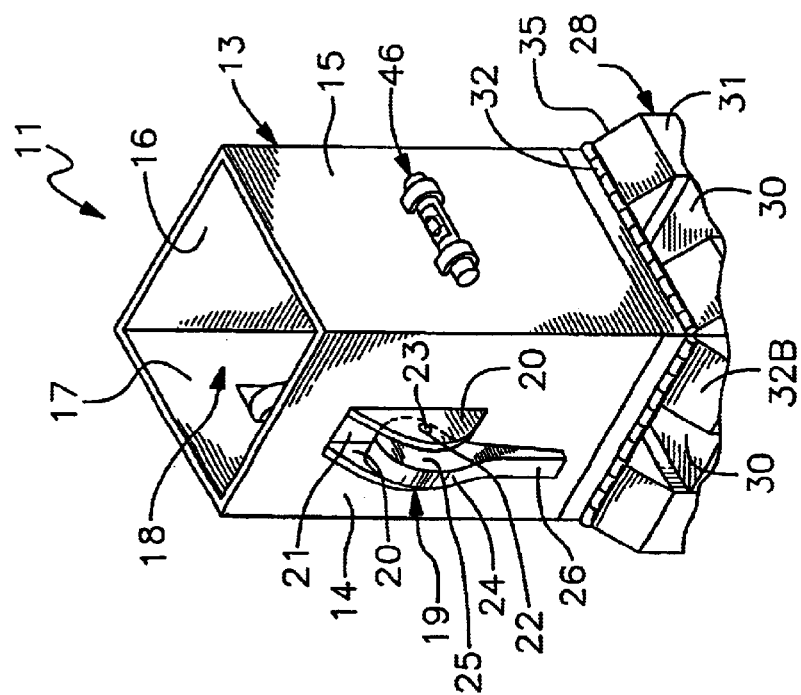
FIG. 2 is a partial perspective view of the post engagement portion of the invention.
Figure 1:
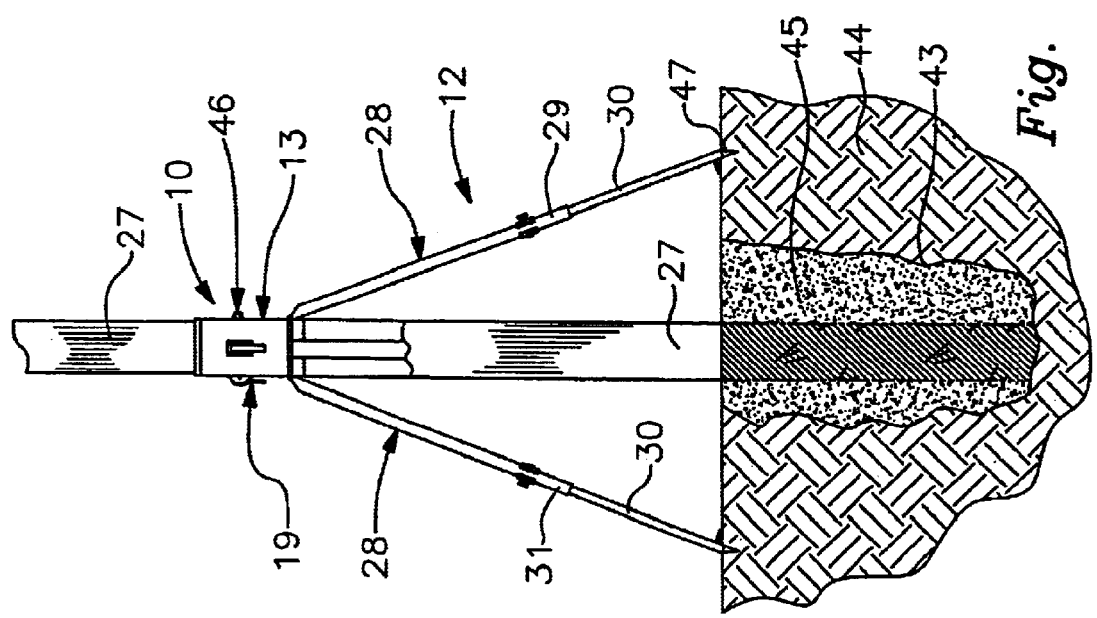
FIG. 1 is a side elevational view of the invention in use on a post set in the ground.
Figure 9:
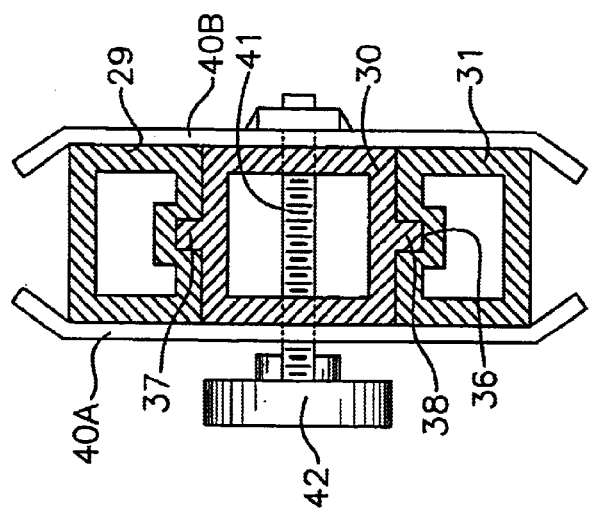
FIG. 9 is a section on lines 9—9 of FIG. 8.

Referring to FIGS. 1, 2 and 3 of the drawings, a post support 10 can be seen having a post engagement portion 11 and multiple ground stabilization portions 12. The post engagement portion 11 is comprised of a generally rectangular retaining sleeve 13 having multiple sides 14, 15, 16 and 17. Each of the respective sides 14–17 is of a generally rectangular configuration and of equal height and width and defines a post engagement area 18 within. A locking post engagement assembly 19 is centered within the respective sides 14 and 17 having a pair of spaced parallel mounting lugs 20 extending therefrom. An opening at 21 is defined between the upstanding lugs 20 which are apertured at 22 for receiving a pivot pin 23 on which is positioned a movable cam arm 24. The cam arm 24, best seen in FIGS. 2 and 3 of the drawings has a cam portion 25 with a corresponding contoured cam engagement surface 25A thereon. A handle extension 26 extends integrally from the cam portion 25 which has an off center mounting aperture for the pivot pin 23, noted above.

Referring now to FIGS. 3 and 6 of the drawings, it will be seen that the retaining sleeve 13 when positioned on a post 27 can be locked thereto by rotation of the respective cam arms 24 indicated by directional arrows A engaging the post 27 forcing the respective sleeve sides 15 and 16 against the post. The cam arms 26 so engage as indicated by the broken lines in FIG. 3 of the drawings will lock in a deployed position due to the respective cam surfaces 25A as will be evident to those skilled in the art.

Figure 8:
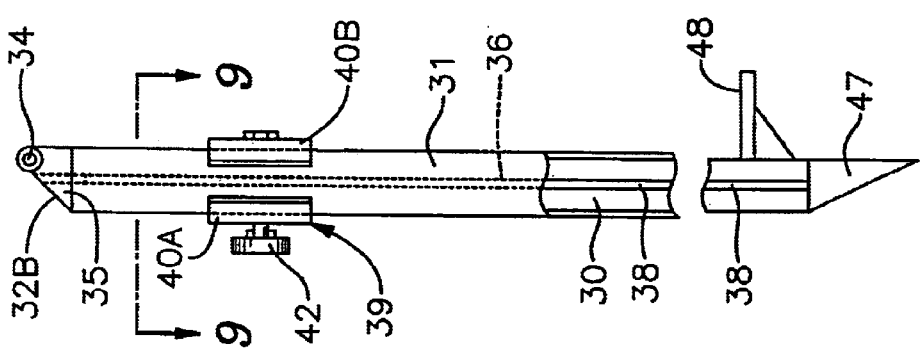
FIG. 8 is an enlarged partial side elevational view of the leg assembly as seen in FIG. 7.
Figure 7:
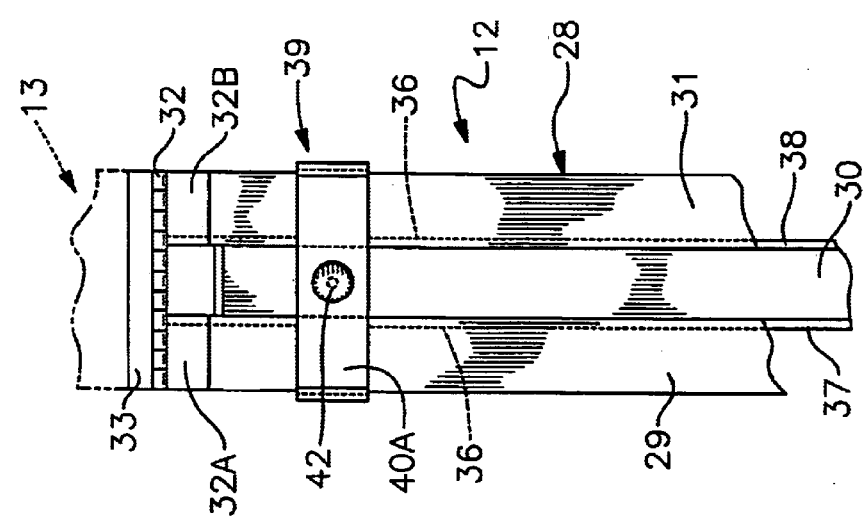
FIG. 7 is an enlarged partial front elevational view of an adjustable leg assembly.

The multiple ground stabilizer portions 12 are each defined by adjustable leg assemblies 28, best seen in FIGS. 1, 4, 6, 7, 8 and 9 of the drawings. Each leg assembly 28 has three tubular leg elements 29, 30, and 31. The leg elements 29 and 31 are secured at the respective upper ends to a hinge mounting fitting 32 which has a pair of leg engagement plates 32A and 32B and sleeve engagement plate 33. A hinge pin 34 interconnects the respective hinge plate portions as in a typical hinge configuration. The leg elements 28 and 31 are tapered on their hinge engagement ends 35 and have respective effacing registration channels 36 that extend longitudinally their entire length. The channels 36 are keyed to registerably accept corresponding ribs 37 & 38 on oppositely disposed longitudinal sides of the center leg 30 as seen in FIG. 7 of the drawings. A leg locking clamp assembly 39 is used to lock the center leg 30 when extended. The clamp assembly 39 has a front and back leg engagement plates 40A and 40B interconnected by an adjustment bolt 41 that extends through said respective plates and the central leg 30. An adjustment knob 42 is threadably secured on the free end of the adjustment bolt 41 allowing for compression of the hereinbefore described engagement plates 40A and 40B against the abutting legs 29, 30 and 31 frictionally locking and holding the center leg 30 in position when extended as best seen in FIGS. 7 and 8 of the drawings.

In use, the post support 10 is positioned on the post 27 that has been inserted within a hole 43 in the ground indicated at 44 and filled thereabout by foundation material such as concrete 45 as best seen in FIG. 1 of the drawings. The retaining sleeve 13 is temporarily secured in place by the activation rotation of the respective cam arms 24 of the locking engagement assemblies 19 as hereinbefore described.

The leg assemblies 28 are then deployed and the post 27 is vertically aligned (plum) by using a pair of horizontally oriented bevel levels 46 that are mounted on the outside surface of respective sleeve sides 15 and 16 in oppositely disposed relation to the locking engagement cam assemblies 19 as best seen in FIGS. 5 and 6 of the drawings. As required, the center legs 30 are extended from the respective leg assemblies at an appropriate support angle illustrated in FIG. 1 of the drawings required to hold the post 27 in the vertically aligned position until the cement 45 is set. Each of the center ground engaging legs 30 has earth engagement stake 47 extending from its free end. A small footpad 48 extends from each of the center legs 30 adjacent the ground engagement stake for insertion of same by applying pressure thereto as will be understood by those skilled in the art. The leg assemblies 28 are then locked in their extended adjusted position by rotation of the adjustment knob 42 drawing the respective engagement plates 40A and 40B together as noted above.

Figure 10:
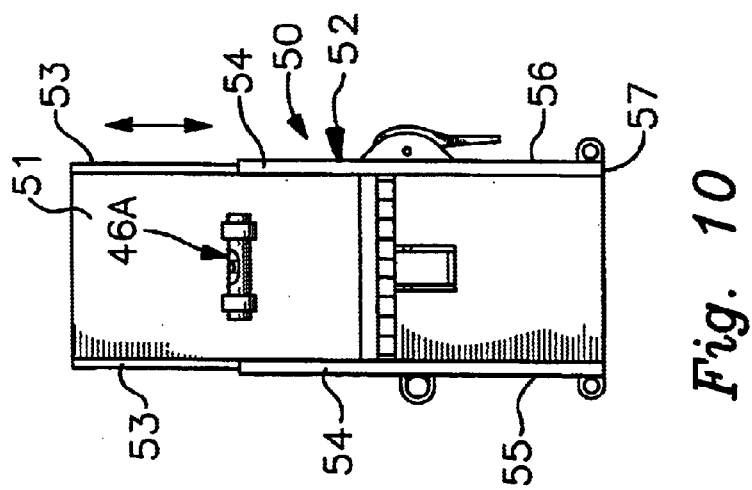
FIG. 10 is a front elevational view of an alternate form of the invention showing a removable portion of the engagement sleeve.

Referring now to FIG. 10 of the drawings, an alternate form of the invention can be seen wherein a post support 50 is illustrated having a removable side panel 51. The removable panel 51 will allow the post support 50 to be used in situation where it is impractical to slip a post engagement sleeve 52 over the end of the post for removal once it has been secured in the ground due to the height of the post which may occur in certain applications. Removable side panel 51 has oppositely disposed engagement edge beads 53 thereon for sliding engagement within corresponding edge channels 54 formed on respective adjacent sleeve panels 55 and 56 of the engagement sleeve. The respective edge channels 54 have closed ends at 57 to prevent the removable panel 51 from sliding therethrough.

Figure 13:
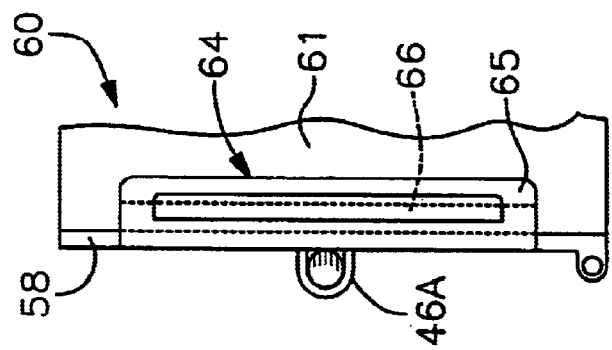
FIG. 13 is a partial side elevational view of the hinged removable panel illustrating an engagement locking latching mechanism thereto.
Figure 12:
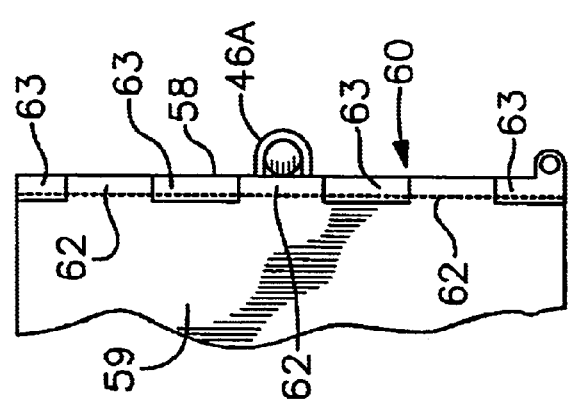
FIG. 12 is a second alternate form of the invention illustrating a hinge configuration for a removable panel of the sleeve.
Figure 11:
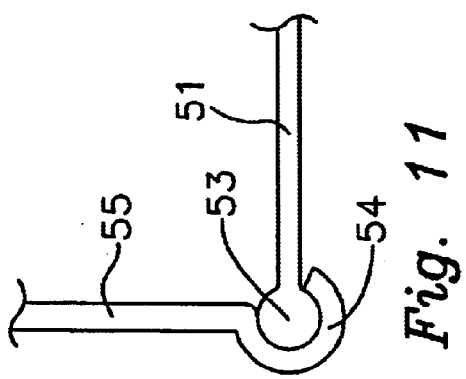
FIG. 11 is an enlarged section of the alternate form of the invention illustrating the engagement of the removable panel to the main sleeve.

Referring now to FIGS. 12 and 13 of the drawings, a second alternate form of the invention can be seen in which a hinged panel 58 is hinged to its respective adjacent side panel 59 on an alternate sleeve assembly 60. The panel 58 can then be hinged outwardly from an adjacent side support panel 61. The side support panel 59 is formed with a plurality of longitudinally spaced hinge elements 62. The hinged panel 58 has corresponding registered hinge elements 63 and a quick release latch 64 illustrated in FIG. 13 of the drawings. The quick release latch has flexible hasp element 65 that frictionally engages an upstanding ridge 66 to secure same when in secured position.

In the preferred form and the alternate form, the panels are preferably made of molded synthetic resin material and is important to note that in all of the alternate forms discussed, the removable hinged panel would preferably have the bubble levels 46A thereon maintaining the fixed panel for locking engagement assembly.

It will be evident from the above description that the leg assemblies 28 will be used with the alternate post engagement sleeves to provide the post stabilization and support needed to effect the proper setting of the post 27 as hereinbefore described.

It will thus be seen that a new and novel post-supporting device has been illustrated and described and it will be apparent to those skilled in the art that various changes and modifications may be made therein without departing from the spirit of the invention, therefore I claim:

1. A post stabilization support to temporarily support a post during installation, said post support comprising, a post engagement sleeve having a plurality of oppositely disposed interengaging side panels, locking post engagement assemblies extending through some of said side panels, adjustable leg assemblies pivotally secured and extending from each of said side panels, means for vertically aligning said sleeve portion on said post in two horizontal planes and means for adjustably extending and locking each of said leg assemblies for ground engagement independently from one another.

2. The post stabilization device set forth in claim 1 wherein said post engagement sleeve is of a rectangular cross section, a pair of adjacent side panels engaging the post opposite said locking post engagement assemblies.

3. The post stabilization support device set forth in claim 1 wherein said locking post assemblies comprise, a cam arm pivotally positioned from a first non-post engagement position to a second post engagement position.

4. The post stabilization support device set forth in claim 1 wherein said adjustable leg assemblies comprises multiple tubular legs, interengaged with one another.

5. The post stabilization support device as set forth in claim 1 wherein said means for vertically aligning said post with said sleeve comprises a bubble level on respective interconnected adjacent side panels of said sleeve.

6. The post stabilization support device set forth in claim 1 wherein said means for adjusting each of said leg assemblies comprises, a central movable leg, a clamp secured to said central movable leg and engageable on said adjacent legs.

7. The post stabilization support device set forth in claim 1 wherein said post engagement sleeve is preferably made of synthetic resin material.

8. The post stabilization support set forth in claim 1 wherein said leg assemblies are preferably made of metallic material.

9. A post stabilization support for temporarily supporting a post in vertical alignment position during installation comprising a post engagement sleeve, a pair of posts registration assemblies on said sleeve arranged for direct contact with the post, a pair of levels on said sleeve for vertical alignment of said stabilization support, multiple leg assemblies pivotally secured to said post engagement sleeve, each of said leg assemblies being longitudinally adjustable, and means for removing a portion of said post engagement sleeve for mounting and removal of said sleeve on said post.

10. The post stabilization support set forth in claim 9 wherein said post engagement sleeve is of a square cross section.

11. The post stabilization support set forth in claim 9 wherein said post registration assemblies comprises, a pivoted cam arm extending through an opening in said sleeve, said arm movable from a first non-engagement position to a second post engagement position.

12. The post stabilization support set forth in claim 9 wherein each of said leg assemblies comprises, a pair of fixed tubular legs having a movable leg registerably therebetween, a clamp secured to said movable leg and registerable on said adjacent legs.

13. The post stabilization support set forth in claim 9 wherein said post engagement sleeve is preferably made of synthetic resin material.

14. The post stabilization support set forth in claim 9 wherein said means for removing one of said post engagement sleeves comprises, a movable sleeve panel.

15. The post stabilization support set forth in claim 9 wherein said post engagement sleeve is comprised of multiple interconnected panels.

16. The post stabilization support set forth in claim 9 wherein said means for removing one of said post engagement sleeves further comprises, a hinged sleeve panel and latch retaining assembly thereon.

* * * * *